US007006898B2

(12) United States Patent
Barbir et al.

(10) Patent No.: US 7,006,898 B2
(45) Date of Patent: Feb. 28, 2006

(54) METHOD AND APPARATUS FOR OPERATING AND CONTROLLING A POWER SYSTEM

(75) Inventors: Frano Barbir, Rocky Hill, CT (US); Stephen C. Porter, Burlington, CT (US); Mark A. Lillis, South Windsor, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 171 days.

(21) Appl. No.: 10/604,395

(22) Filed: Jul. 17, 2003

(65) Prior Publication Data

US 2005/0012638 A1 Jan. 20, 2005

(51) Int. Cl.
*G05D 11/00* (2006.01)
*H01M 8/04* (2006.01)

(52) U.S. Cl. .......................... 700/286; 700/79; 429/22; 702/60

(58) Field of Classification Search .................. 700/79, 700/286; 713/300; 361/1; 327/199; 429/22–25; 702/60
See application file for complete search history.

(56) References Cited

U.S. PATENT DOCUMENTS

| | | | | |
|---|---|---|---|---|
| 4,192,906 | A | 3/1980 | Maru | 429/13 |
| 5,586,156 | A * | 12/1996 | Gaubatz | 376/216 |
| 6,030,718 | A | 2/2000 | Fuglevand et al. | 429/26 |
| 6,218,035 | B1 | 4/2001 | Fuglevand et al. | 429/30 |
| 6,387,556 | B1 * | 5/2002 | Fuglevand et al. | 429/22 |
| 6,503,649 | B1 | 1/2003 | Czajkowski et al. | 429/23 |
| 6,562,494 | B1 | 5/2003 | Tsai et al. | 429/9 |
| 6,573,682 | B1 | 6/2003 | Pearson | 320/101 |
| 2004/0056706 | A1 * | 3/2004 | Takahashi et al. | 327/535 |
| 2004/0229097 | A1 * | 11/2004 | Hirakata et al. | 429/24 |

* cited by examiner

*Primary Examiner*—Jayprakash N. Gandhi
(74) *Attorney, Agent, or Firm*—Cantor Colburn LLP

(57) ABSTRACT

A method and apparatus for operating a power system is disclosed. A plurality of sensor signals each representative of an operating characteristic of a power system module are received at a common data bus. The sensor signals are received and analyzed at a controller for the presence of an abnormal operating condition, and in response thereto it is determined whether an operational adjustment of the power system module is desirable. In response to the existence of a desirable adjustment condition, the operation of the power system module is automatically adjusted. A sensor of the plurality of sensors is arranged for providing an operating characteristic that is derivable from one or more of the other sensors, which include a different type of sensor, thereby providing redundant system information for determining whether an operational adjustment of the power system module is desirable.

21 Claims, 7 Drawing Sheets

METHOD AND APPARATUS FOR OPERATING AND CONTROLLING A POWER SYSTEM

BACKGROUND

This disclosure relates generally to the operation and control of a power system, and more particularly to a communication and control arrangement in a modular power system for providing a reliable and autonomously controlled power system.

Discrete distributed power systems are used or contemplated for use in numerous applications, including primary or backup power for high value commercial equipment such as telecommunications infrastructure, primary or backup power to commercial and residential buildings, and primary or backup power to renewable energy sources for use in non-ground-based systems such as a High Altitude Airship (HAA), for example. A typical primary power system may include a power source such as a diesel or gasoline powered generator, a fuel storage tank, and a set of batteries to store energy, for example. A typical renewable energy source may include Photovoltaic (PV) arrays, for example. In applications involving primary or backup power for a HAA, it is desirable to combine a renewable energy source, such as PV arrays for example, with a regenerative energy source, such as a regenerative fuel cell system utilizing electrochemical cells for example. However, in HAA applications, there is a challenge to provide a system that is self sustaining during long-term missions of up to one year or more. While existing power systems are suitable for their intended purposes, there still remains a need for improvements for HAA applications. In particular, a need exists for a power system with appropriate safeguards that will enable it to operate autonomously and reliably for extended periods of time.

SUMMARY OF THE INVENTION

In an embodiment, a method for operating a power system is disclosed. A plurality of sensor signals are received at a common data bus, where each sensor signal is representative of an operating characteristic of a power system module. The sensor signals at the common data bus are received and analyzed at a controller for the presence of an abnormal operating condition, and in response thereto it is determined whether an operational adjustment of the power system module is desirable. In response to the existence of a desirable adjustment condition, the operation of the power system module is automatically adjusted. A first sensor of the plurality of sensors is arranged for providing an operating characteristic that is derivable from one or more of the other sensors, the one or more other sensors including a different type of sensor than the first sensor, thereby providing redundant system information for determining whether an operational adjustment of the power system module is desirable.

In another embodiment, a control system for a power system includes a controller having a processor for executing instructions for monitoring sensor signals at a common data bus, receiving and analyzing the sensor signals to determine the existence of a malfunctioning device, and automatically reconfiguring other operational devices controlled by the control system to accommodate for the malfunctioning device. The common data bus is in signal communication with a plurality of sensors, where each sensor signal is representative of an operating characteristic of the power system, and the malfunctioning device includes a sensor, a processing element, an output device, or a control device.

In a further embodiment, a control system for a power system includes a processor for executing instructions for determining whether a sensor reports an abnormal operating condition, and in response thereto, for determining whether the sensor is unhealthy. In response to the presence of an unhealthy sensor, the processor executes instructions for determining whether the operating characteristic sensed by the unhealthy sensor is derivable from one or more other sensors in the power system, the one or more other sensors including a different type of sensor than the unhealthy sensor. In response to the operating characteristic sensed by the unhealthy sensor not being derivable, the processor executes instructions for determining whether an operational adjustment of the power system or a portion thereof is desirable. If an operational adjustment is desirable, the processor executes instructions for automatically adjusting the operating condition of the power system or a portion thereof.

BRIEF DESCRIPTION OF THE DRAWINGS

Referring now to the drawings wherein like elements are numbered and/or labeled alike in several Figures.

DETAILED DESCRIPTION

Embodiments of the invention provide a method and apparatus for providing modular power in a flexible power system defined by various operating modules, wherein the modules are in operable communication with each other and are controlled by a processor receiving and analyzing redundant system information, thereby providing a reliable and autonomously controlled power system.

Figure 1:
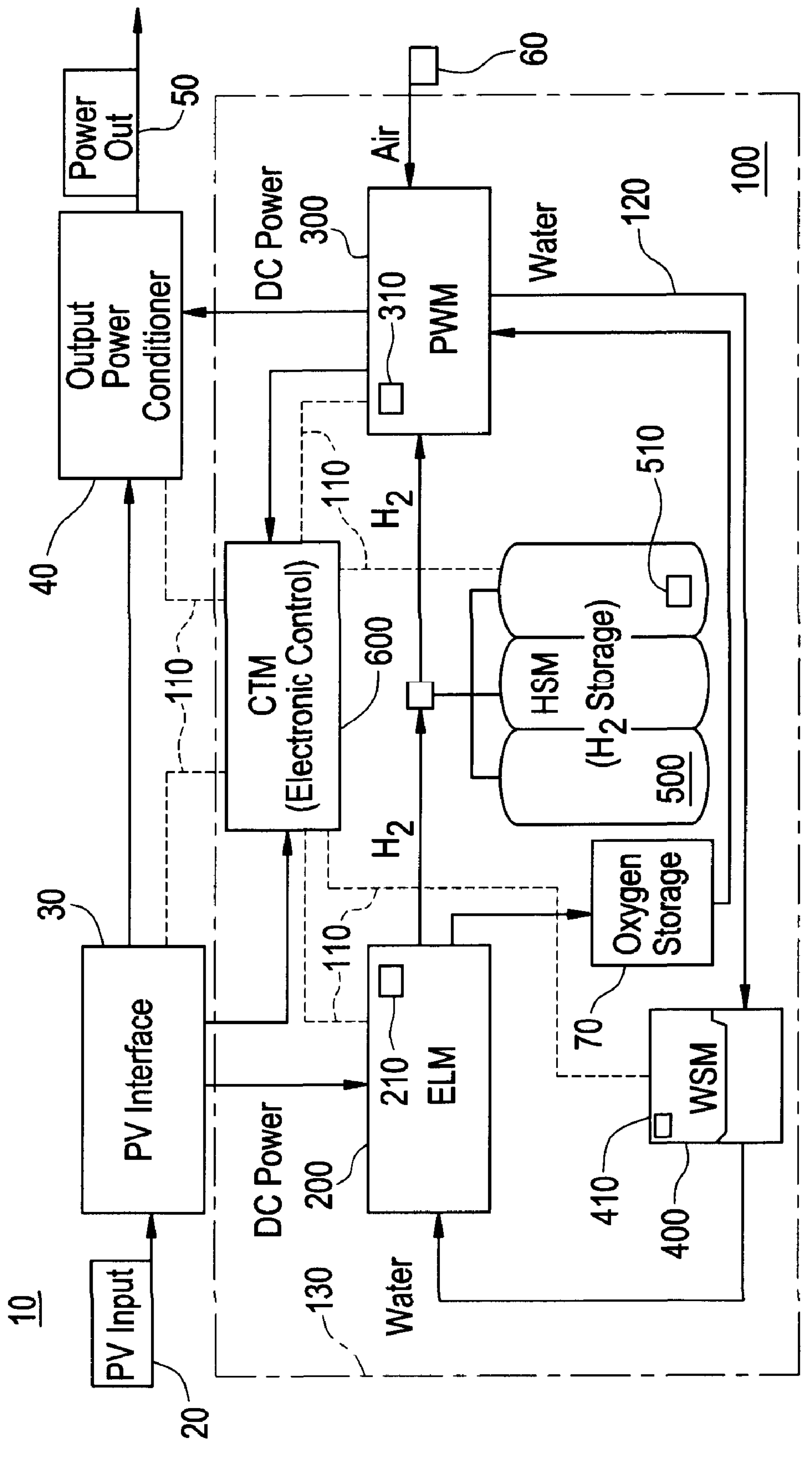
FIG. 1 depicts a schematic representation of an exemplary power system for employing an embodiment of the invention.

FIG. 1 is an exemplary embodiment of a power system 10 having a renewable energy source, such as a Photo-Voltaic (PV) array for example, providing input power 20 to a PV Interface 30, a regenerative electrochemical cell Modular Power System (MPS) 100, employing Proton Exchange Membrane (PEM) processes for example, and an Output Power Conditioner (OPC) 40 that provides Power Out 50, which may be ac (alternating current) or dc (direct current) power. In an embodiment, MPS 100 includes an electrolyzer module (ELM) 200, a power module (PWM) 300, a water storage module (WSM) 400, a hydrogen storage module (HSM) 500, and a controller module (CTM) 600. CTM 600 is in operable communication with each power system module 200, 300, 400, 500 via communication bus 110 (represented by dashed lines) and local controllers (LCC)

Figure 2:
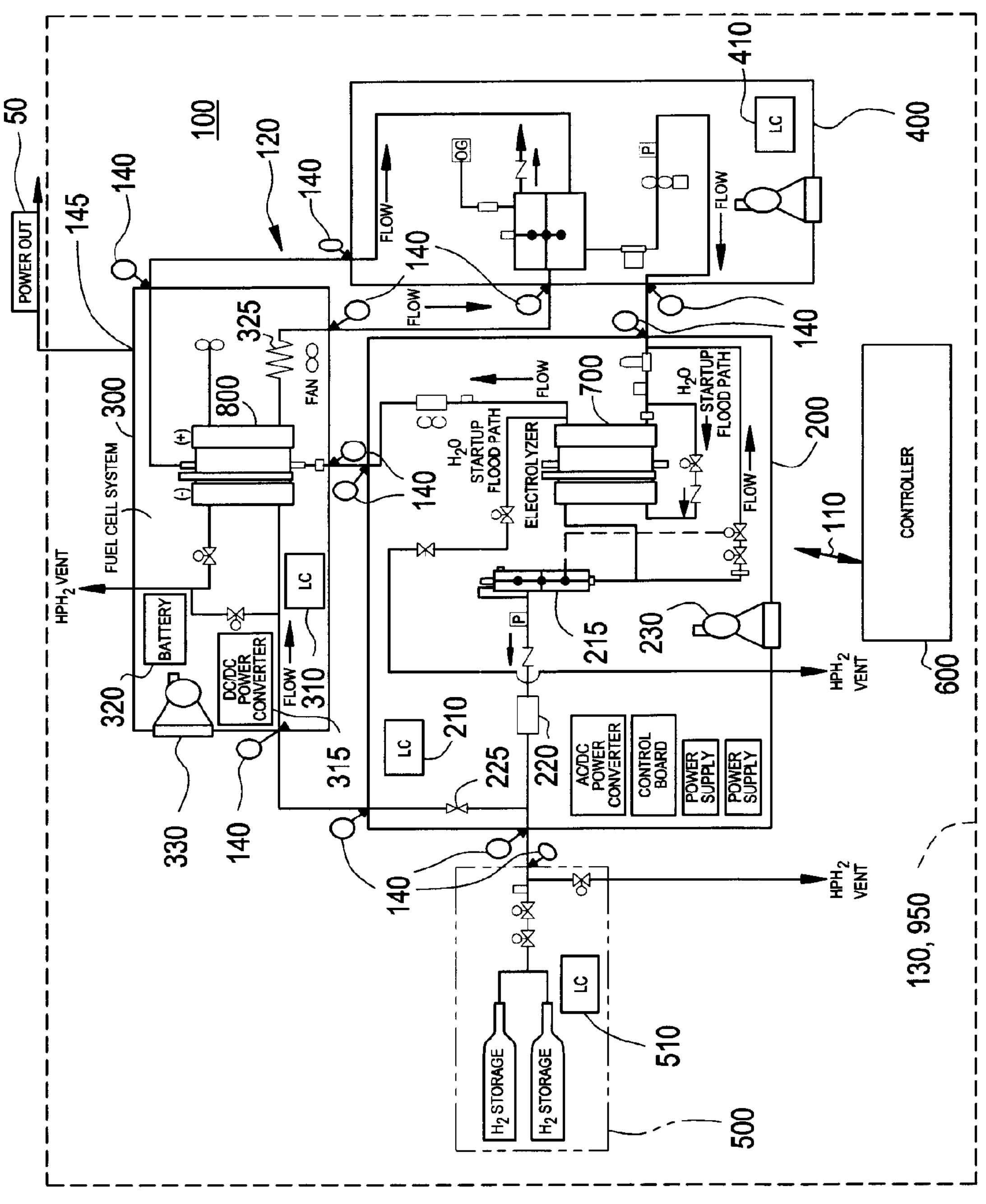
FIG. 2 depicts a schematic representation of an exemplary regenerative electrochemical cell modular power system for use in the system of FIG. 1.

210, 310, 410, 510. Power system modules 200, 300, 400, 500 are in power and/or fluid communication with each other via a conduit network 120. The fluid communication in conduit network 120 may allow for hydrogen flow in either direction thereby providing more effective utilization of space within the confines of the MPS enclosure 130. In an embodiment, PWM 300 incorporates technology for creating electricity from hydrogen, such as a PEM fuel cell, or a generator (e.g., driven by an internal combustion engine, hydropower, wind power, solar power, or the like). As discussed herein, where PWM 300 is configured as a fuel cell, it may also be referred to as a fuel cell module (FCM) 300. CTM 600 is also in operable communication with PV interface 30 and OPC 40 via communication bus 110. A more detailed schematic of MPS 100 is depicted in FIG. 2, which shows ELM 200 having an electrolyzer 700 and phase separator 215, and FCM 300 having an electrochemical fuel cell system 800. Other details relating to MPS 100 and depicted in FIG. 2 will be discussed further below.

Figure 3:
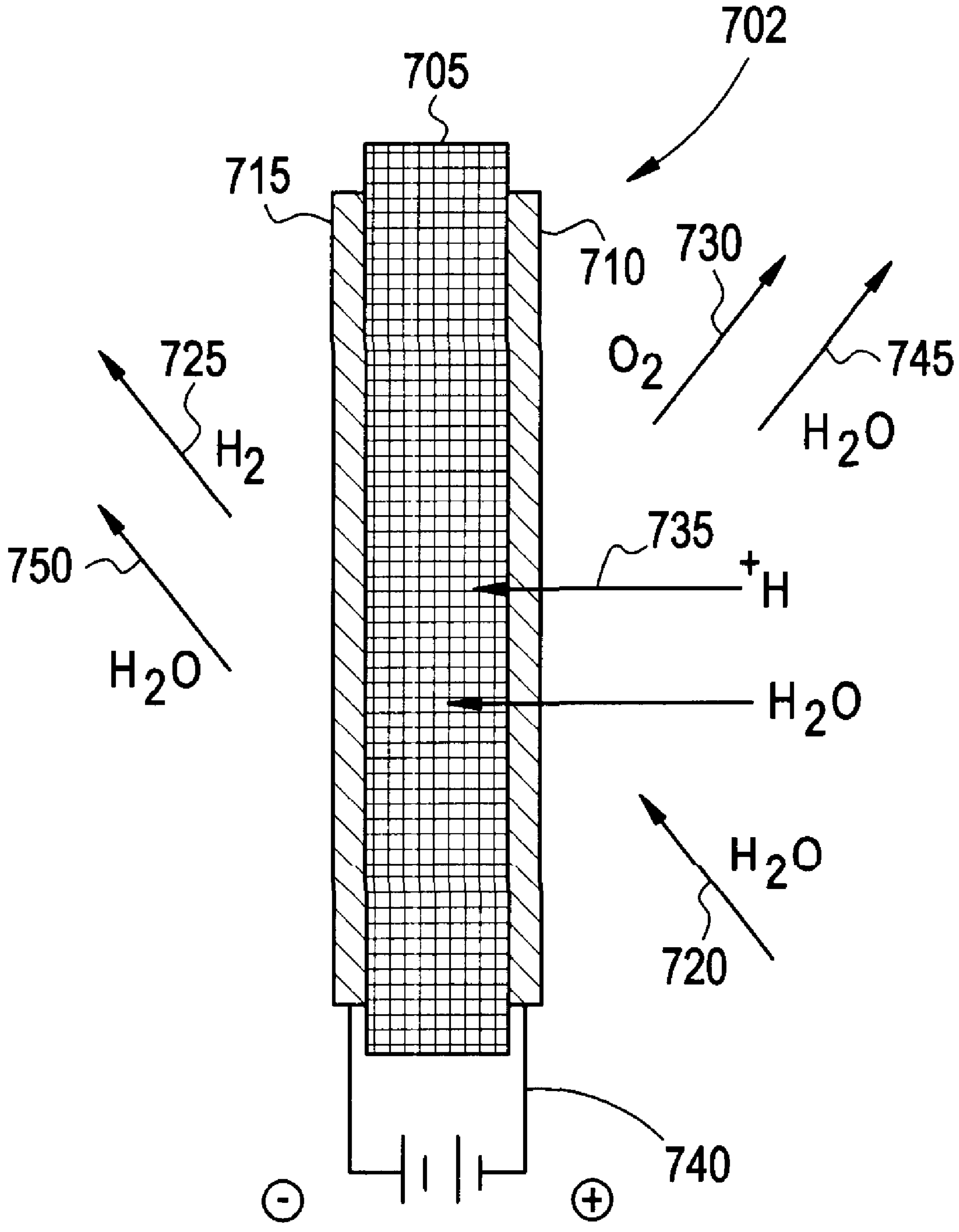
FIG. 3 depicts a schematic representation of an exemplary anode feed electrolysis cell for use in the system of FIG. 2.

Referring now to FIGS. 2–3, electrochemical energy conversion cells employed in embodiments of ELM 200 and FCM 300 will be discussed. Although embodiments disclosed below are described in relation to an electrochemical power system including a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, and iodine. Upon the application of different reactants and/or different electrolytes, the flows and reactions change accordingly, as is commonly understood in relation to that particular type of electrochemical cell. Electrochemical cells may be configured as electrolysis cells or fuel cells, as will be discussed below.

Referring now to FIG. 3, an electrochemical cell configured as an anode fed electrolysis cell 702, which may be formed in a stack of one or more to form electrolyzer 700 and employed in an embodiment of ELM 200, is depicted in section view having a proton exchange membrane (PEM) 705 arranged between an oxygen electrode (anode) 710 and a hydrogen electrode (cathode) 715. Electrolysis cell 702 functions as a hydrogen generator by electrolytically decomposing process water 720 to produce hydrogen gas 725 and oxygen gas 730. Process water 720 is fed into electrolysis cell 702 at anode 710 to form oxygen gas 730, electrons, and hydrogen ions (protons) 735. The chemical reaction is facilitated by the positive terminal of a power source 740 connected to anode 710 and the negative terminal of power source 740 connected to cathode 715. Power source 740 may be internal or external to ELM 200 and may include a battery or a connection to utility power or a renewable energy source. In an exemplary embodiment, power source 740 is fed by PV interface 30. Oxygen gas 730 and a first portion 745 of the water are discharged from electrolysis cell 702, while protons 735 and a second portion 750 of the water migrate across PEM 705 to cathode 715. At cathode 715, hydrogen gas 725 is removed, generally through a gas delivery line at conduit network 120. The removed hydrogen gas 725 is usable in a myriad of different applications. Second portion 750 of water is also removed from cathode 715.

ELM 200 may include a number of individual electrolysis cells 702 arranged in a stack with process water 720 being directed through the cells via input and output conduits formed within the stack structure. Electrolysis cells 702 within the stack are sequentially arranged, with each cell 702 having a membrane-electrode assembly (MEA) defined by a proton exchange membrane 705 disposed between a cathode 715 and an anode 710. The cathode 715, anode 710, or both may be gas diffusion electrodes that facilitate gas diffusion to the proton exchange membrane 705. Each membrane-electrode assembly is in fluid communication with flow fields adjacent to the membrane electrode assembly and defined by structures configured to facilitate fluid movement and membrane hydration within each individual electrolysis cell 702.

The water 750 discharged from the cathode side 715 of the electrolysis cell 702, which is entrained with hydrogen gas, may be fed to a phase separator 215 (see FIG. 2) to separate the hydrogen gas 725 from the water 750, thereby increasing the hydrogen gas yield and the overall efficiency of electrolysis cell 702 in general. The removed hydrogen gas 725 may be fed either to a dryer 220 (see FIG. 2) for removal of trace water, to HSM 500, which may be a cylinder, a tank, or a similar type of containment vessel, or directly to an application for use as a fuel, such as to FCM 300 (see FIGS. 1 and 2).

Another type of water electrolysis cell (not shown) that utilizes the same configuration as is shown in FIG. 3 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the electrolysis cell at the cathode side without passing through the membrane.

A typical fuel cell system 800 (depicted in FIG. 2) also utilizes the same general MEA configuration as the electrochemical cell of FIG. 3, depicted therein as an electrolysis cell. In the fuel cell system 800 configuration, hydrogen gas 725 is introduced to hydrogen electrode 715 (the anode in the fuel cell system 800), while oxygen 730, or an oxygen-containing gas such as air, is introduced to oxygen electrode 710 (the cathode in the fuel cell system 800). The hydrogen gas for fuel cell operation can originate from a pure hydrogen source, a hydrocarbon, methanol, an electrolysis cell 702 such as that described above with reference to FIG. 3, or any other source that supplies hydrogen at a purity level suitable for fuel cell operation. The hydrogen gas 725 electrochemically reacts at the anode 715 to produce protons 735 and electrons, the electrons flow from the anode through an electrically connected external load, and the protons 735 migrate through the proton exchange membrane 705 to the cathode 710. At the cathode 710, the protons and electrons react with oxygen 730 to form product water 720.

The general operation of MPS 100 involves the delivery of water from WSM 400 to ELM 200, where the water is electrolyzed to form hydrogen and oxygen gas. The hydrogen gas is dispensed from ELM 200 to HSM 500, from which it is periodically retrieved and dispensed to FCM 300. Once received in FCM 300, the hydrogen gas is reacted with oxygen, from either an air supply 60 or from oxygen production at ELM 200, to produce electrons and water. In HAA applications, oxygen production at ELM 200 may be stored at oxygen storage device 70 for subsequent use at FCM 300. Power is distributed from MPS 100 by directing the electrons to output power conditioner 40 for subsequent delivery, depicted generally as power out 50, to an attached load (not shown). Excess water is returned to WSM 400. The operation and control of MPS 100 and the distribution of power is governed by CTM 600, LCCs 210, 310, 410, 510 and embedded application software, as will be discussed in more detail below.

Figure 4:
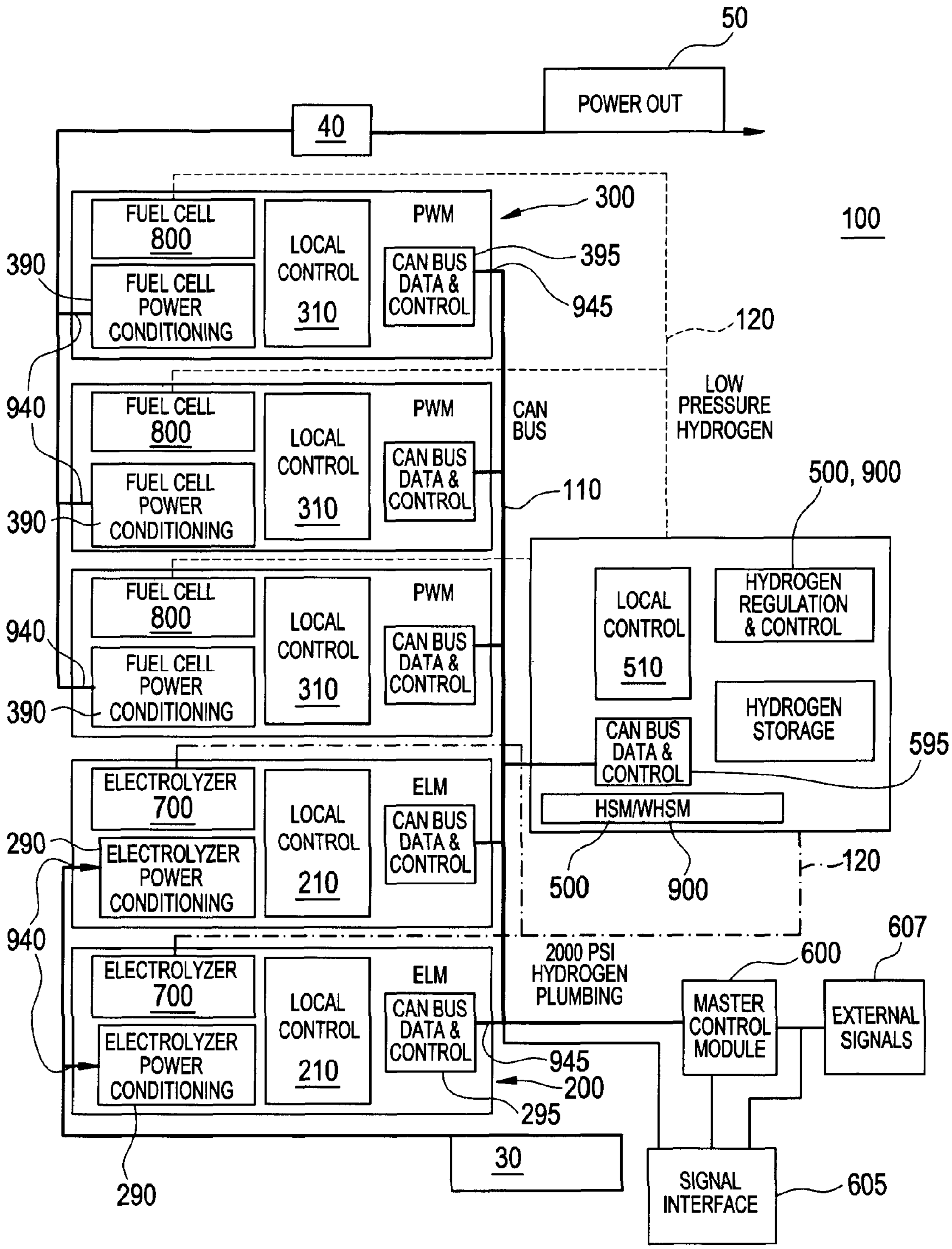
FIG. 4 depicts a schematic representation of an exemplary communication system for use in the system of FIG. 1.

Referring now to FIG. 4, an embodiment of MPS 100 includes a plurality of ELMs 200, a plurality of PWMs 300, and a HSM 500, all in signal communication with each other via communication bus 110 and internal buses 295, 395, 595, respectively. In an embodiment, communications bus 110, LCCs 210, 310, 510 and internal buses 295, 395, 595 may operate under a Controller Area Network (CAN) bus and associated communications protocol, where a broadcast communication is achieved by using a message oriented transmission protocol. Here, messages communicated between modules are identified by using a message identifier, which is unique within the network and not only defines the content but also the priority of the message. By utilizing a CAN scheme, MPS 100 can be upgraded by installing newer modules or additional modules without having to make any hardware or software modifications to the existing modules. Other communication schemes may be equally applicable for implementing the disclosed invention and may be substituted for the CAN protocol communication scheme.

In alternative embodiments, CTM 600 may be present and configured as a master control module to serve as a centralized controller with LCCs 210, 310, 410, 510 operating as local controller sub-systems, or may not be present as a separate module, but may have some or all of its functionality embedded within LCCs 210, 310, 410, 510, thereby providing for a distributed control scheme, or may be present with limited functionality to serve as a signal interface, such as provided by signal interface 605, to send and receive external signals 607 and communicate those signals with MPS 100. External signals 607 may be wired or wireless, and may employ radio frequency signals, microwave signals, optical signals, or any other type of communication signal appropriate for the environment in which power system 10 is employed, such as in a HAA for example. Alternatively, CTM 600 and signal interface 605 may both be present in MPS 100 to provide coordinated signal processing. In an alternative embodiment, HSM 500 may be replaced with an integrate water and hydrogen storage module (WHSM), depicted generally at 900, in which case LCC 410 and LCC 510 may be integrated into one local controller, herein referred to as LCC 510. In a further alternative embodiment, electrolyzer 700, and accompanying necessary hardware, may be mounted or integrated into the assembly of HSM 500, thereby providing a more compact hydrogen generator and storage module.

In an embodiment, modules 200 and 300 include a communications port 945, depicted generally in FIG. 4 as the connection point between communications bus 110 and modules 200, 300, which is in signal communication with an associated local controller, 210 or 310 for example. In a centralized control scheme, data and control signals from CTM 600 are communicated to the appropriate local controller of a module via communication bus 110 and communication port 945. In a distributed communication scheme, data and control signals from one local controller are communicated to another local controller via communication bus 100 and communication port 945.

As depicted in FIG. 4, ELM 200 and PWM 300 may include power conditioning units 290, 390, respectively. Power conditioning unit 290 receives power from PV interface 30 and delivers conditioned power to electrolyzer 700 at power source 740, and power conditioning unit 390 provides power out 50 from fuel cell 800 via output power conditioner 40. In alternative embodiments, power conditioning unit 390 may be separate from or integrated with output power conditioner 40.

Figure 5:
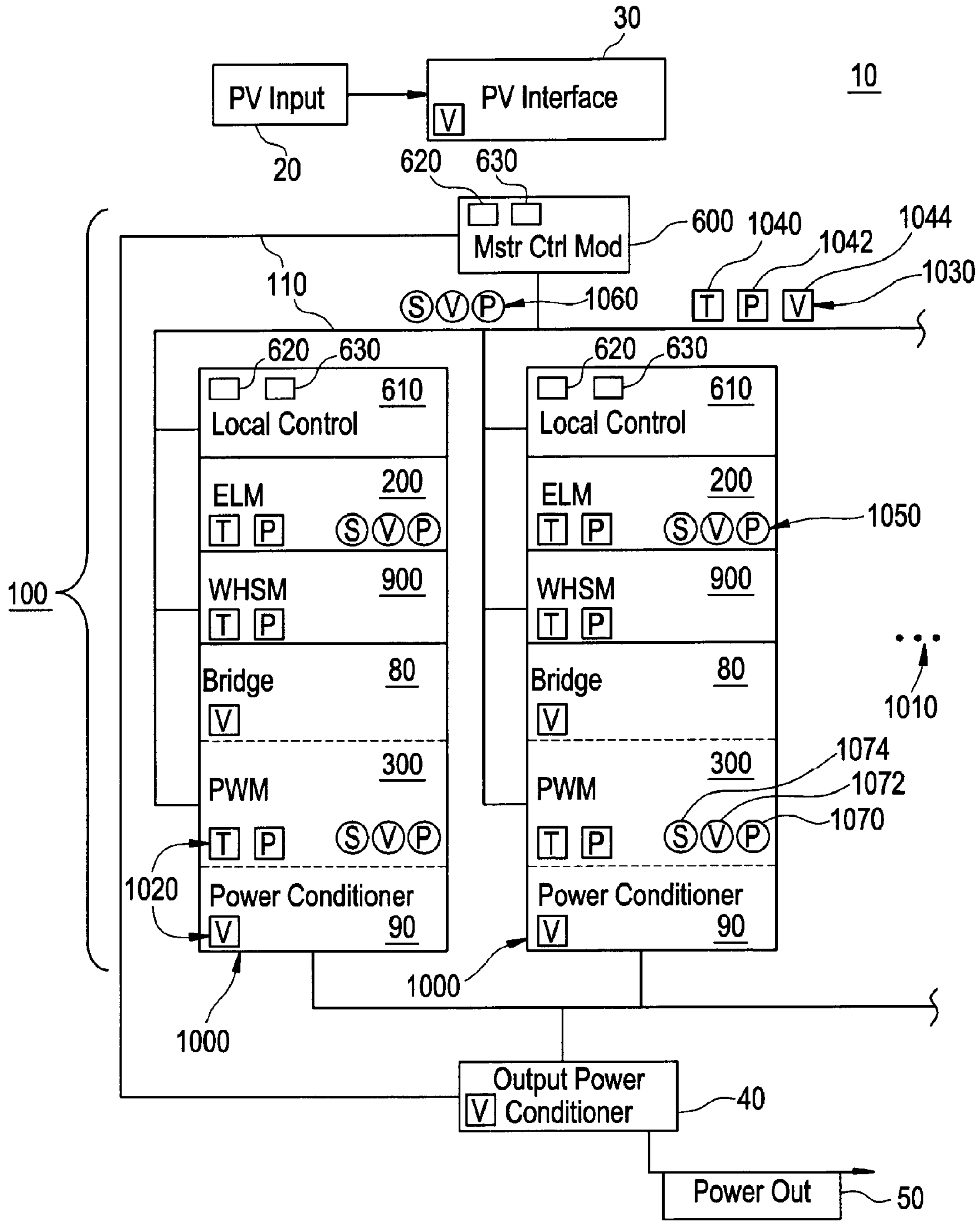
FIG. 5 depicts an alternative communication system to the system of FIG. 4.

Referring now to FIG. 5, an alternative arrangement of ELMs 200 and PWMs 300 is depicted within power system 10. Whereas in FIG. 4 each ELM 200 and PWM 300 is depicted grouped with a like module, FIG. 5 depicts each ELM 200 and PWM 300 grouped in a module set 1000 along with other system modules, discussed further below, and with communication bus 110 providing a common data bus between all modules. As depicted by ellipses 1010, other module sets 1000 may be attached to communications bus 110, and to conduit network 120 (shown in FIGS. 1, 2 and 4 and omitted from FIG. 5 for clarity). FIG. 5 depicts each module set 1000 having a local controller 610, and ELM 200, a WHSM 900, a bridge 80, a PWM 300, and a power conditioner 90. Local controller 610 is similar to LCCs 210, 310, 410, 510, but serves to control the entire set of modules within module set 1000 as opposed to controlling only one type of module. Each system module within module set 1000 is referred to simply as a system module, or power system module, and includes any one of the aforementioned modules 610, 200, 900, 80, 300 and 90.

Similar to the discussion above, CTM 600 may be present and configured as a master control module to serve as a centralized controller with local controllers 610 of each module set 1000 operating as a local controller subsystem, or may not be present as a separate module but may have some or all of its functionality embedded within each local controller 610, thereby providing for a distributed control scheme. In either arrangement, CTM 600 and local controllers 610 may operate under a Controller Area Network (CAN) bus with associated communications protocol, as discussed above. CTM 600, LCCs 210, 310, 410, 510, and local controller 610 include a processor 620 and a memory 630, depicted in FIG. 5, for storing and executing control instructions provided by embedded software, and for storing operational information such as operating characteristics in lookup tables for example. Processor 620 may be a microprocessor or any other processing device sufficient to control power system 10. Bridge 80 provides a similar function as power conditioning unit 290 discussed above, but instead of serving conditioned power to just electrolyzer 700 it serves conditioned power to all modules within module set 1000, thereby reducing the number of components within and the overall size and weight of power system 10. Power conditioner 90 provides a similar function as power conditioning unit 390 and may also be separate from or integrated with output power conditioner 40.

As mentioned above, the output power, depicted generally as power out 50, may be ac (alternating current) or dc (direct current) power. In alternative embodiments, the output power is provided at about 24 VDC (volts direct current) or about 48 VDC, depending on the market needs, and the input power at PV input 20 and PV interface 30 is provided at about 120/240 VAC (volts alternating current), single-phase, at about 50/60 Hz (Hertz). However, MPS 100 may be designed to operate over a wider range of input voltages, such as from about 85 to about 264 VAC input, for example. An embodiment of MPS 100 has an output current of about 42 amps, with a minimum of about 0 amps and a maximum of about 45 amps, at an output voltage of about 24 VDC +/−0.5 VDC. In an embodiment, MPS 100 has an output voltage that deviates no more than about +/−0.5 VDC in response to an ambient temperature variation from about −40 deg-C. (degrees Celsius) to about +50 deg-C., and can operate at an altitude equal to or less than about 80,000 feet.

In an embodiment and referring to FIG. 5, the operational control of power system 10 by CTM 600, LCCs 210, 310, 410, 510, and/or local controllers 610, is assisted by strategically placed sensors 1020, 1030 throughout power system 10, with sensors 1020 referring generally to sensors placed within an operational module to sense the operating characteristics of that particular module, and sensors 1030 referring generally to sensors placed to sense the operating characteristics of power system 10 as a whole. Sensors 1020, 1030 may be different types of sensors and include but are not limited to temperature sensors, depicted as a boxed-T 1040, pressure sensors, depicted as a boxed-P 1042, and voltage sensors, depicted as a boxed-V 1044. As herein used, the nomenclature for identifying a module temperature sensor is 1020, 1040, and the nomenclature for identifying a system temperature sensor is 1030, 1040. Other sensors, such as flow meters and ammeters for example, may be employed as appropriate for carrying out the control function herein disclosed.

Also provided within power system 10 are control devices 1050, 1060 for controlling the flow of power, fluid, gas, coolant, and heat, for example, within and between modules of power system 10, with control devices 1050 referring generally to devices placed within an operational module to control an operating characteristic of that particular module, and control devices 1060 referring generally to devices placed to control an operating characteristic of power system 10 as a whole. Exemplary control devices 1050, 1060 include but are not limited to pumps, depicted as a circled-P 1070, valves, depicted as a circled-V 1072, and electrical switches, depicted as a circled-S 1074. As herein used, the nomenclature for identifying a module pump control device is 1050, 1070, and the nomenclature for identifying a system pump control device is 1060, 1070. Other control devices, such as fans, compressors and variacs for example, may be employed as appropriate for carrying out the control function herein disclosed.

The plurality of sensors 1020, 1030 provide a plurality of sensor signals from either the system modules of module set 1000, or power system 10 as a whole, with the respective signals being received at common data bus 110. While reference is made herein to FIG. 5 regarding the signal flow and control scheme of power system 10, it will be appreciated that a similar arrangement applies to the modular configuration depicted in FIG. 4 and to any other modular configuration of system modules that may be employed in practicing the teachings of the present invention.

The sensor signals are received from common data bus 110 at local controller 610 and/or CTM 600, depending on whether a centralized or distributed control scheme is implemented as discussed above, and analyzed for the presence of an abnormal operating condition or for the presence of a malfunctioning device, where the malfunctioning device may include, for example, a sensor 1020, 1030, a processing element 200, 300, an output device 90, 40, a control device 1050, 1060, or any combination thereof.

Upon receipt of sensor or device information, by continuous polling by CTM 600 and/or local controller 610, or by continuously monitoring the signal traffic on common data bus 110, for example, processor 620 accesses operational information in a lookup table in memory 630 to determine whether that particular sensor or device is providing a normal operational reading. The lookup table in memory 630 may be an actual table of values upon which processor 620 performs an interpolation/extrapolation technique, or may be a transfer function upon which processor 620 performs a calculation. In response to processor 620 determining that an abnormal operating condition exists, processor 620 then determines whether an operational adjustment is desirable at one of the control devices at the system module level or at the power system level. An adjustment may be made to either compensate for the abnormal condition, or to accommodate for the malfunctioning device, discussed further below. It should be noted that not all abnormal operating conditions reported by a sensor may warrant an operational adjustment. For example, if a sensor is unhealthy, discussed further below, or if a sensor reading is just outside of an acceptable range, then processor 620, via the embedded application software, may seek information from other sources to determined whether an operational adjustment should be made. Also, if a sensor is healthy, but reports an abnormal condition, processor 620 may use statistical tools such as trending or control sampling to determine whether an operational adjustment should be made. An abnormal condition may be the result of an anomaly, a data point that is an outlier, or the result of signal noise, in which case the utilization of statistical techniques by processor 620 may avoid unwarranted system adjustments. Other decisions regarding the desirability of an operational adjustment may come from processor 620 accessing a lookup table at memory 630 to determine whether the sensors are sensing operating characteristics, and thereby reporting on operating conditions, that are within an expected range for the existing power condition and fuel consumption of power system 10. In conjunction with the lookup table at memory 630, processor 620 may employ interpolation or extrapolation techniques, or other algorithms, for comparing sensed operating characteristics to expected operating characteristics at a given system power level. In response to processor 620 determining that an operational adjustment is desirable, processor 620 automatically adjusts a control device 1050, 1060, by changing the operating state of at least one of a pump 1070, a valve 1072, a switch 1074, or any combination thereof, for example, in a direction to compensate for the abnormal condition, or to accommodate for the malfunctioning device. For example, if the temperature or pressure at an electrolyzer 700 at an ELM 200 is above normal, then processor 620 may reduce the flow of processing water and the available power by adjusting a pump 1070 or a valve 1072 and operating a switch 1074 at the effected ELM 200. Also, if a system module pump 1050, 1070 malfunctions and continued operation of that module would risk the integrity of the module and possibly the integrity of the power system 10 as a whole, then processor 620 may shut down the operation of that particular module to prevent an entire system shutdown, which in essence results in an automatic reconfiguring of the controlled operational devices and the control system as a whole. In an embodiment, processor 620 may run power system 10 at reduced performance to accommodate the malfunctioning device or loss of data therefrom.

In an alternative embodiment employing MPS 100 as depicted in FIG. 4 with a plurality of fuel cell power modules 390, a failure of one module may be detected by the remaining modules via common communication bus 110, whereby the remaining modules make compensating adjustments using logic contained in local controllers 310.

In another alternative embodiment employing MPS 100 as depicted in FIG. 5 having a plurality of Electrolyzer Modules 200, a temperature sensor failure in one module may be compensated for by temperature readings at a similar temperature sensor in another module based on algorithmic assumptions about present operating modes of both modules and predefined physical and mathematical relationships between similar units that may be running at slightly differing operating conditions or modes.

In a further alternative embodiment employing MPS 100 as depicted in FIG. 5, the loss of an ambient temperature sensor in Power Module 300 may be synthesized using the temperature reading at WHSM 900. The synthesis may include mathematical formulas and interpolation tables that represent the physical relationship between these temperatures under idealized theoretical data and/or previously measured data.

To ensure high reliability for autonomous control of power system 10, redundant sensors and multiple channel communication may be employed, thereby enabling an operating characteristic monitored by a particular sensor to be derivable from one or more other sensors in the system. In this manner, redundant system information is available from a plurality of sources and over a plurality of channels for determining whether an operational adjustment of MPS 100 or a portion thereof is desirable. In some cases, it may be necessary to shut down MPS 100 or a portion thereof, and in other cases it may just be necessary to store the data relating to the operating characteristics of MPS 100 at memory 630 and to report the stored data to an external system or user on demand via signal interface 605. Processor 620 and embedded application software are configured for multi-channel communication. In an embodiment, processor 620 may utilize a portion of the stored data using programmed adaptive logic to synthesize a replacement signal or to command a degraded operational mode.

Figure 6:
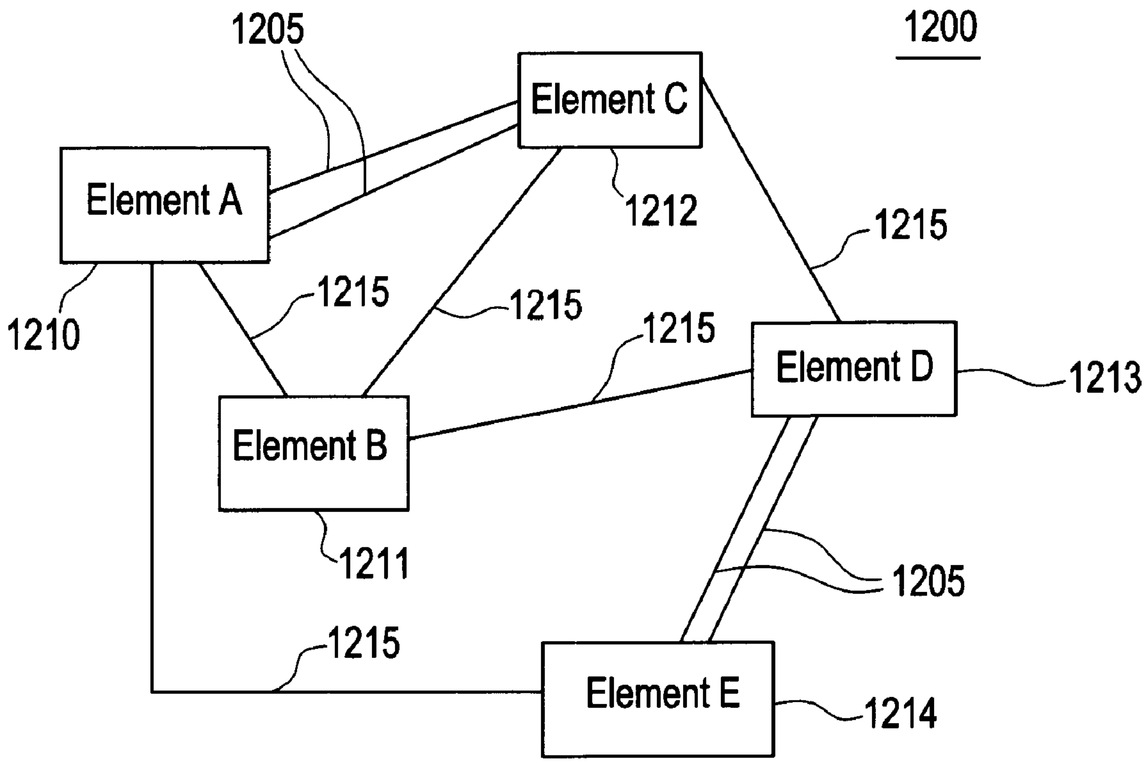
FIG. 6 depicts an exemplary communications architecture for implementing an embodiment of the invention.

Although a common bus 110 is shown for illustration, power system 10 may be configured using the invention described herein by employing a redundant common bus communications scheme, best seen by now referring to the communications architecture 1200 depicted in FIG. 6. In reference to FIG. 6, elements of power system 10 are depicted generally as Elements A, B, C, D and E, and identified by numerals 1210, 1211, 1212, 1213 and 1214 (1210–1214), respectively, which may refer to any of the aforementioned modules, and interconnecting lines between Elements A, B, C, D and E represent lines of communication. Redundant channels 1205 are represented by double lines, as depicted between Elements A and C, and between Elements D and E, and non-redundant channels (simplex channels) 1215 are represented by single lines. In an embodiment, communication bus 110 may be configured as two or more segmented buses over which data may be transferred between system Elements 1210–1214 in a parallel fashion to facilitate redundancy management. The two or more segmented buses may be composed of redundant channels 1205, simplex channels 1215, or any combination thereof. For example, communication between Element A 1210 and Element E 1214 may occur directly via simplex channel 1215, or indirectly via segmented buses composed of simplex channel 1215 to Element B 1211, simplex channel 1215 to Element D 1213, and redundant common bus 1205 to Element E 1214. Other communication paths will be readily recognized by one skilled in the art. In the preceding example, the utility of a redundant common bus communication scheme is achieved without actually requiring a single bus that is common to all elements, with inter-bus communications being accomplished via a microprocessor or other data translation hardware, firmware and/or software combination. As depicted in FIG. 6, the implementation of the redundant common bus communication scheme may be a combination of simplex and redundant channels arranged in a network between elements to facilitate a packet switching arrangement and ensure message delivery under single or multiple bus failures. In an embodiment, the communication architecture depicted in FIG. 6 may be implemented using a TCP/IP protocol over an Ethernet network.

Figure 7:
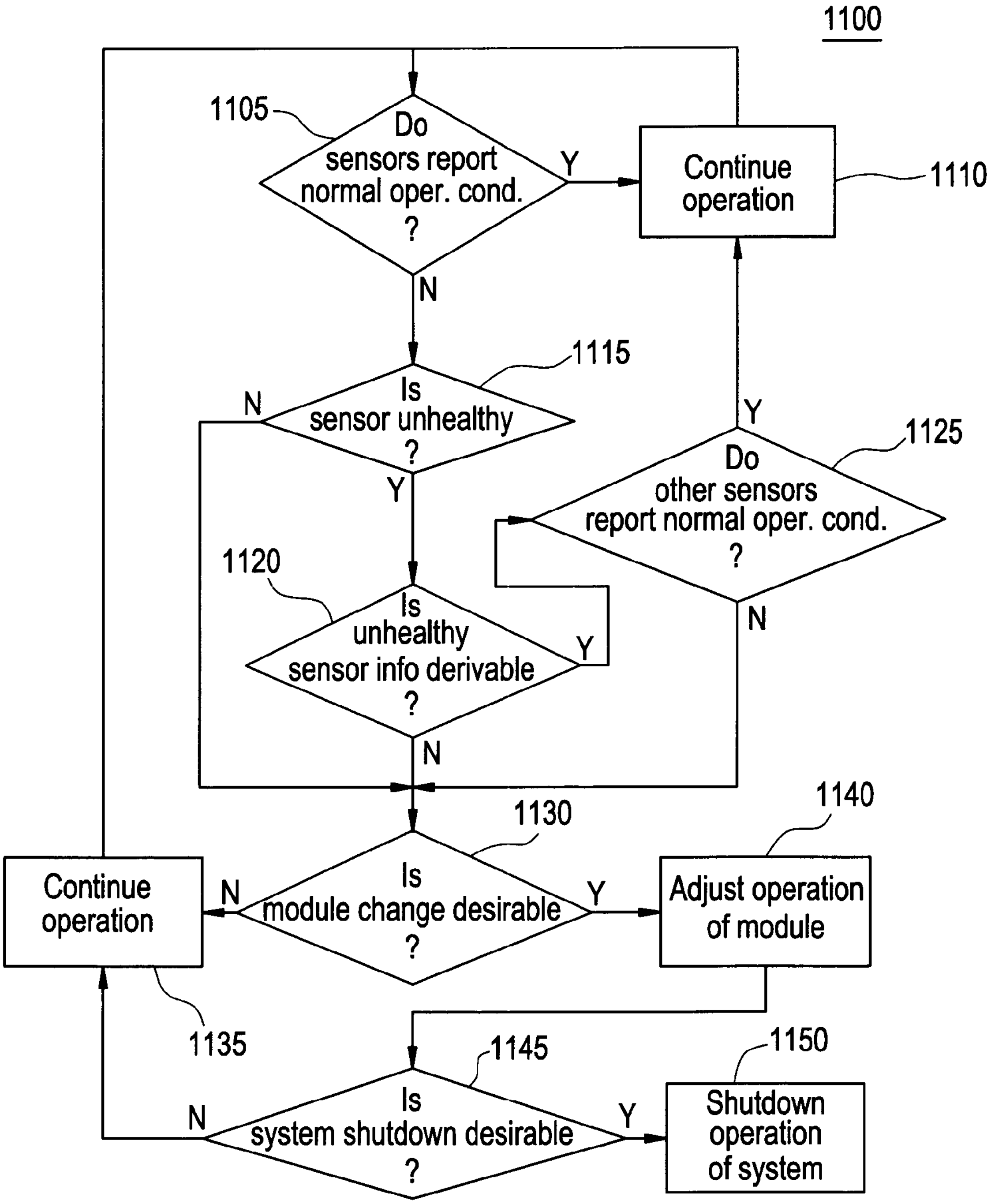
FIG. 7 depicts an exemplary process for implementing an embodiment of the invention in the system of FIG. 1.

Referring now to FIG. 7, an exemplary process 1100 for determining whether an operational adjustment should be carried out by processor 620 is depicted. Process 1100 is depicted as a continuous loop process, indicating a control scheme that continuously monitors signal traffic on common data bus 110. At block 1105, processor 620 determines whether each sensor 1020, 1030 is reporting a normal operating condition. If yes, then control passes to block 1110 where power system 10 continues operation, and process 1100 continues by reentering decision block 1105. If no, then control passes to block 1115 where processor 620 determines whether the reporting sensor is an unhealthy sensor. In an embodiment, a sensor may be considered to be unhealthy if it is not reporting any signal when it should or if its signal is representative of an unattainable value. In another embodiment, two sensors may be employed along with a voting scheme, whereby a high sensor reading in the first sensor may take precedence over a low sensor reading in the second sensor, thereby resulting in the second sensor being considered unhealthy. Other unhealthy sensor characteristics may be stored in memory 630 and used by processor 620 for comparative analysis. The number of sensors deployed to monitor a particular aspect of the power system operation, such as pressure or temperature for example, is determined by the importance of that parameter with regard to the overall system operation. Also, the scheme to determine the health of any one sensor, such as averaging multiple sensors, selecting the closest two out of three, or using the highest or lowest reading, for example, is dependent on the importance of the parameter being sensed to the overall system operation.

If the sensor is considered to be unhealthy, process control passes to block 1120 where it is determined whether the sensed characteristic of the unhealthy sensor is derivable from one or more other sensors in power system 10. For example, in the two sensor scenario discussed above, the first sensor reading would take precedence over the second. In another example, a sensor reading at a system module sensor 1020 may be derivable via a set of system transfer functions involving both system module sensors 1020 and power system sensors 1030, which collectively provide redundant information in the event that any one sensor becomes unhealthy.

In response to the sensed characteristic of the unhealthy sensor being derivable, process control passes to block 1125 where processor 620 determines whether the other sensors in the system are reporting a normal operating condition. In determining that a normal operating condition is present, process control passes to block 1110 and continues as discussed above.

In response to the sensed characteristic of the unhealthy sensor not being derivable, or in response to the derived characteristic by other sensors in the system being indicative of an abnormal operating condition, process control passes to block 1130 where it is determined whether an operational adjustment of a system module within module set 1000 is desirable, as discussed above. If it is considered desirable to make no system module adjustment, process control passes to block 1135 where power system 10 continues operation and process 1100 continues by reentering decision block 1105.

If it is considered desirable to make an operational adjustment to a system module, process control passes to block 1140 where processor 620 automatically adjusts a control device 1050, 1060 in a direction to compensate for the abnormality, as discussed above. Following block 1140, process control passes to block 1145 where processor 620 determines whether it is desirable to shutdown the operation of MPS 100 or a portion thereof, such as when the integrity of the system is at risk for example. If no, then process control passes to block 1135 and process 1100 continues as discussed above. If yes, then process control passes to block 1150 where processor 620 shuts down MPS 100 or a portion thereof.

Some embodiments of the invention may include some of the following advantages: autonomous control; no or very low maintenance; built in safeguards; system segmentation through modularity of design; centralized or distributed control arrangements; data recording and reporting on demand; and scaleable system through modularity of design.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for operating a power system, comprising:

receiving a plurality of sensor signals at common data bus, each sensor signal representative of an operating characteristic of a power system module;

receiving and analyzing at a controller the sensor signals from the common data bus for the presence of an abnormal operating condition, and in response thereto determining whether an operational adjustment of the power system module is desirable; and in response to the existence of a desirable adjustment condition, automatically adjusting operation of the power system module;

wherein a first sensor of the plurality of sensors is arranged for providing an operating characteristic that is monitored by the first sensor and that is derivable from one or more of the other sensors, the one or more other sensors including a different type of sensor than the first sensor, thereby providing redundant system information for determining whether an operational adjustment of the power system module is desirable.

2. The method of claim 1, further comprising:

providing to the common data bus an additional sensor signal representative of an operating characteristic of the power system, which results from an operating characteristic at one or more of the power system module.

3. The method of claim 1, wherein the common data bus includes a simplex channel, a redundant channel, or any combination thereof, arranged for parallel signal communication.

4. The method of claim 1, wherein the analyzing further comprises:

determining whether a sensor reports an abnormal operating condition;

in response to a sensed abnormal operating condition, determining whether the sensor is unhealthy;

in response to the presence of an unhealthy sensor, determining whether the operating characteristic sensed by the unhealthy sensor is derivable from one or more other sensors in the power system;

in response to the operating characteristic sensed by the unhealthy sensor not being derivable, determining whether an operational adjustment of the power system module is desirable; and in response to a desirable adjustment condition, automatically adjusting operation of the power system module.

5. The method of claim 4, further comprising:

in response to the operating charactaistic sensed by the unhealthy sensor being derivable but the derived characteristic being indicative of an abnormal operating condition, determining whether an operational adjustment of the power system module is desirable.

6. The method of claim 5, wherein automatically adjusting the power system module comprises:

changing an operating state of a valve, a pump, a switch, or an output device.

7. The method of claim 6, wherein said changing the operating state comprises:

shutting down the power system module.

8. The method of claim 6, wherein said changing the operating state comprises:

running the power system at reduced performance to accommodate the desirable adjustment condition.

9. The method of claim 1, further comprising:

monitoring the sensor signals at the common data bus; and in response to an abnormal operating condition, automatically adjusting an operating state of a control device, in a direction to compensate for the abnormal operating condition.

10. The method of claim 1, further comprising:

storing data relating to an operating characteristic of the power system module; and reporting the stored data to an external system or user on demand.

11. The method of claim 10, further comprising:

processing at least a portion of the stored data to synthesize a replacement signal or to command a degraded operational mode.

12. A control system for a power system, comprising:

a controller having a processor for executing instructions for:

monitoring sensor signals at a common data bus, the common data burn in signal communication with a plurality of sensors, each sensor signal representative of an operating characteristic of the power system;

receiving and analyzing the sensor signals to determine the existence of a malfunctioning device, the malfunctioning device including a sensor, a processing element, an output device, or a control device; and automatically reconfiguring other operational devices controlled by the control system to accommodate for the malfunctioning device.

13. The system of claim 12, wherein the processor further executes instructions for communicating over multiple channels.

14. The system of claim 13, wherein the processor further executes instructions for:

receiving and analyzing the sensor signals to determine the existence of an unhealthy sensor signal; and substituting a redundant sensor signal or a derived sensor signal for the unhealthy sensor signal.

15. The system of claim 14, wherein the automatically reconfiguring comprises:

adjusting an operating state of a control device, substituting a redundant sensor signal or a derived sensor signal for the unhealthy sensor signal, shutting down a power system module, or running the power system in a degraded mode.

16. The system of claim 12, wherein the processor further executes instructions for:

analyzing the sensor signals for the presence of an abnormal operating condition and in response thereto, adjusting an operating state of a control device in a direction to compensate for the abnormal operating condition.

17. The system of claim 12, wherein the processor further executes instructions for:

storing data relating to an operating characteristic of the power system; and reporting the stored data to an external system or user on demand.

18. A control system for a power system, comprising:

a processor for executing instructions for:

determining whether a sensor reports an abnormal operating condition;

in response to a reported abnormal operating condition, determining whether the sensor is unhealthy;

in response to the presence of an unhealthy sensor, determining whether the operating characteristic sensed by the unhealthy sensor is derivable from one or more other sensors in the power system, the one or more other sensors including a different type of sensor than the unhealthy sensor;

in response to the operating characteristic sensed by the unhealthy sensor not being derivable, determining whether operational adjustment of the power system or a portion thereof is desirable; and in response to the existence of desirable adjustment condition, automatically adjusting the operating condition of the power system or a portion thereof.

19. The system of claim 18, further wherein the processor is for executing instructions for:

in response to the operating characteristic sensed by the unhealthy sensor being derivable but the derived operating characteristic being indicative of an abnormal operating condition, determining whether an operational adjustment of the power system or a portion thereof is desirable.

20. The system of claim 19, wherein automatically adjusting the operating condition comprises:

adjusting an operating state of a control device in a direction to compensate for the abnormal operating condition.

21. The system of claim 19, further comprising:

a communication architecture for communicating sensor signals between elements of the power system, the communication architecture including a common data bus having a simplex channel, a redundant channel, or any combination thereof, arranged for parallel signal communication.

* * * * *